United States Patent
Biondo et al.

(10) Patent No.: US 8,914,173 B2
(45) Date of Patent: Dec. 16, 2014

(54) METHOD AND SYSTEM FOR CONDITIONING AN ENERGY STORAGE SYSTEM (ESS) FOR A VEHICLE

(75) Inventors: William A. Biondo, Beverly Hills, MI (US); David T. Proefke, Madison Heights, MI (US); Clark E. McCall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 623 days.

(21) Appl. No.: 12/974,610

(22) Filed: Dec. 21, 2010

(65) Prior Publication Data

US 2012/0158228 A1   Jun. 21, 2012

(51) Int. Cl.
| | |
|---|---|
| B60L 11/02 | (2006.01) |
| B60K 6/00 | (2006.01) |
| B60L 1/00 | (2006.01) |
| B60L 11/18 | (2006.01) |
| B60L 11/12 | (2006.01) |
| B60L 1/02 | (2006.01) |
| B60L 3/12 | (2006.01) |
| B60L 11/00 | (2006.01) |

(52) U.S. Cl.
CPC ......... *B60L 11/1874* (2013.01); *B60L 2250/16* (2013.01); *B60L 1/003* (2013.01); *B60L 2240/622* (2013.01); *B60L 2210/40* (2013.01); *Y02T 10/7005* (2013.01); *B60L 11/126* (2013.01); *B60L 1/02* (2013.01); *Y02T 10/7241* (2013.01); *Y02T 10/7077* (2013.01); *B60L 2240/545* (2013.01); *Y02T 90/162* (2013.01); *Y02T 10/7022* (2013.01); *B60L 2240/549* (2013.01); *B60L 11/1875* (2013.01); *B60L 2240/667* (2013.01); *Y02T 10/705* (2013.01); *B60L 3/12* (2013.01); *B60L 11/005* (2013.01); *Y02T 10/6217* (2013.01); *B60L 2240/547* (2013.01); *B60L 11/1857* (2013.01); *Y02T 90/16* (2013.01); *Y10S 903/903* (2013.01); *Y10S 903/907* (2013.01)
USPC ............. 701/22; 701/123; 320/150; 320/137; 429/62; 429/61; 429/7; 180/65.265; 180/65.275; 180/65.29; 903/903; 903/907; 340/636.1; 340/636.18; 340/636.2

(58) Field of Classification Search
USPC .............. 320/150, 132, 137; 429/120, 62, 61; 180/65.265, 65.275, 65.29; 324/433; 903/903, 907; 340/636.1, 636.15, 340/636.18, 636.2
See application file for complete search history.

(56) References Cited

U.S. PATENT DOCUMENTS

| | | | | |
|---|---|---|---|---|
| 6,118,237 | A * | 9/2000 | Kikuchi et al. ................ | 318/139 |
| 7,154,068 | B2 * | 12/2006 | Zhu et al. ....................... | 219/202 |
| 2005/0228553 | A1 * | 10/2005 | Tryon ............................. | 701/22 |
| 2010/0256931 | A1 | 10/2010 | Proefke et al. | |
| 2010/0304193 | A1 * | 12/2010 | Karlsson et al. ................ | 429/50 |

* cited by examiner

*Primary Examiner* — Adam Tissot
(74) *Attorney, Agent, or Firm* — Lionel D. Anderson; Reising Ethington P.C.

(57) ABSTRACT

A method and system for conditioning an energy storage system (ESS) for a vehicle, like a high-voltage battery or a fuel cell used for vehicle propulsion. It may be detrimental for a high-voltage battery in a parked vehicle to be exposed to extreme temperatures for an extended period of time. Thus, the method and system may be used to condition such a battery—for example, by heating it up if it is too cold or by cooling it down if it is too hot—so that the performance, durability, lifespan and/or other aspects of the battery are improved. In an exemplary embodiment, the method predicts if the battery will need conditioning the next time the vehicle is parked and, if such conditioning is needed, then the method predicts if the battery has sufficient charge to perform this conditioning. If the charge appears insufficient, then the method operates an energy generator that provides additional charge to the battery in anticipation of the needed conditioning.

18 Claims, 3 Drawing Sheets

METHOD AND SYSTEM FOR CONDITIONING AN ENERGY STORAGE SYSTEM (ESS) FOR A VEHICLE

TECHNICAL FIELD

The present invention generally relates to energy storage systems (ESSs) in vehicles and, more particularly, to methods and systems for conditioning ESSs in vehicles, such as high-voltage batteries or fuel cells used for vehicle propulsion.

BACKGROUND

Electric vehicles and hybrid electric vehicles typically include an energy storage system (ESS) of some type, such as a high-voltage battery. Such ESSs can be affected by temperature and/or other environmental conditions. For instance, if a high-voltage battery is exposed to extremely cold temperatures for a prolonged amount of time, such as when the vehicle is parked, the power limits of the battery may be reduced. Conversely, if a high-voltage battery is exposed to extremely hot temperatures for a prolonged period of time, the battery may experience some type of accelerated aging process that reduces its lifespan. Prolonged exposure by a high-voltage battery to a certain environment, such as when the battery is in an unattended or parked vehicle, is sometimes referred to as "soaking" or a "soaked condition."

SUMMARY

According to one embodiment, there is provided a method of conditioning an energy storage system (ESS) for a vehicle. The method may comprise the steps of: (a) determining if the energy storage system (ESS) is likely to need conditioning the next time that the vehicle is parked; (b) determining if the energy storage system (ESS) is likely to have enough charge to perform the conditioning the next time that the vehicle is parked; (c) if step (b) determines that the energy storage system (ESS) is likely to have enough charge to perform the conditioning, then enabling the conditioning for the next time that the vehicle is parked; and (d) if step (b) determines that the energy storage system (ESS) is not likely to have enough charge to perform the conditioning, then operating an energy generator that provides the energy storage system (ESS) with additional charge.

According to another embodiment, there is provided a method of conditioning an energy storage system (ESS) for a vehicle. The method may comprise the steps of: (a) receiving an energy storage system (ESS) temperature; (b) predicting if the energy storage system (ESS) is likely to be exposed to extreme temperatures for an extended period of time while the vehicle is parked; and (c) if the energy storage system (ESS) temperature exceeds a temperature threshold and step (b) predicts that the energy storage system (ESS) is likely to be exposed to extreme temperatures for an extended period of time, then operating a cooling unit or a heating unit that influences the energy storage system (ESS) temperature.

According to another embodiment, there is provided a conditioning system for use in a vehicle. The conditioning system may comprise: a control module, a high-voltage battery for vehicle propulsion, an energy generator that is coupled to the control module and the high-voltage battery, and at least one of a cooling unit or a heating unit that is coupled to the high-voltage battery and influences a battery temperature. The control module predicts if additional charge will be needed for the cooling unit or the heating unit to influence the battery temperature during a future park cycle, and the control module controls the energy generator based on the prediction.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

Figure 1:
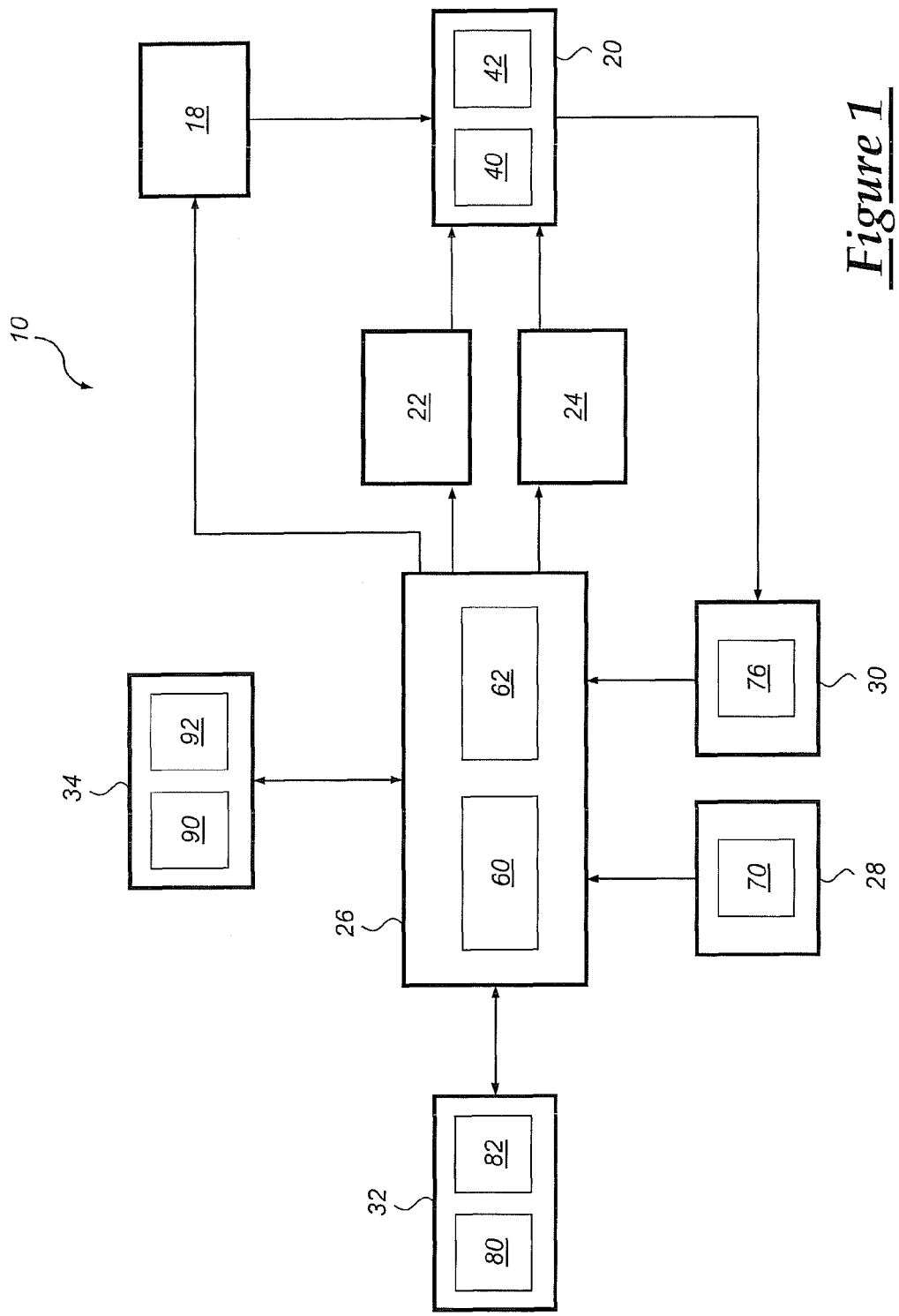
FIG. 1 is a schematic block diagram of an exemplary conditioning system for an energy storage system (ESS) in a vehicle.

The method and system described herein may be used to condition an energy storage system (ESS) for a vehicle, like a battery or a fuel cell used for vehicle propulsion. The term "conditioning," as used herein, broadly includes any action or operation where a thermal aspect of an ESS is altered, manipulated, maintained or otherwise controlled. Some non-limiting examples of "conditioning" include: controlling a heating and/or cooling unit that is thermally coupled to a high-voltage battery used for vehicle propulsion. As mentioned above, it can be detrimental for a high-voltage battery in a parked vehicle to be exposed to extreme temperatures for an extended period of time. Thus, the exemplary method and system described herein may be used to condition such a battery—for example, by heating it up if it is too cold or by cooling it down if it is too hot—so that the performance, durability, lifespan and/or other aspects of the battery are improved.

It should be appreciated that the present method and system may be used with any type of vehicle having an energy storage system (ESS), including: hybrid electric vehicles (HEVs), plug-in hybrid electric vehicles (PHEVs), extended-range electric vehicles (EREVs), battery electrical vehicles (BEVs), fuel cell vehicles, etc. The method described herein is not limited to the particular ESS conditioning system shown in FIG. 1, and may be used with any number of different vehicle systems. For example, the present method and system may be used in conjunction with one or more aspects of the invention described in U.S. Ser. No. 12/472,063 filed on May 26, 2009, which is assigned to the present assignee and is incorporated herein by reference. According to one exemplary embodiment, ESS conditioning system 10 generally includes an energy generator 18, an energy storage system (ESS) 20, a heating unit 22, a cooling unit 24, a control module 26, an external data unit 28, an internal data unit 30, a communications module 32, and an interface 34.

Energy generator 18 may create charge or electrical energy that is provided to energy storage system (ESS) 20 and/or an electrical bus that drives different electrical devices located throughout the vehicle. As with all of the exemplary components described herein, energy generator 18 may be one of any number of suitable generators known in the art and is certainly not limited to any particular type. For instance, energy generator 18 may include a small-displacement turbo-charged, super-charged or naturally aspirated gasoline or diesel engine that is mechanically coupled to and drives an electrical generator. Other types and arrangements of energy generators are certainly possible.

Energy storage system (ESS) 20 may store electrical energy for vehicle propulsion, as well as to meet other electrical needs of the vehicle. According to an exemplary embodiment, ESS 20 is a battery having a high-voltage battery pack 40 (e.g., 40V-600V battery pack) and a battery control unit 42. Battery pack 40 may include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other suitable battery technology. Battery control unit 42 may include any combination of electronic devices including, but certainly not limited to, processing devices, memory devices, communication devices and/or sensors. The various devices and components of battery control unit 42 may be located within the actual ESS 20, outside of it, or some combination thereof. ESS 20 should be designed to withstand repeated charge and discharge cycles and may be used in conjunction with other energy storage devices, such as capacitors, super capacitors, inductors, etc. Those skilled in the art will appreciate that ESS 20 may be provided according to any number of different embodiments, may be connected in any number of different configurations, and may include any number of different components. ESS 20 is not limited to the battery example shown and described herein. For instance, in another exemplary embodiment, ESS 20 includes a fuel cell and corresponding electronic components. Although the following description refers to ESS 20 in terms of a "battery" or a "high-voltage battery," it should be appreciated that the ESS may be a fuel cell or any other type of suitable energy storage system found in a vehicle.

Heating unit 22 may be thermally coupled to energy storage system (ESS) 20 so that it can manage, control, manipulate and/or otherwise influence the temperature of the ESS. For example, heating unit 22 may include one or more heating elements in close proximity with different sections of high-voltage battery pack 40 so that they can raise the temperature of the battery pack during cold environments. Heating unit 22 may include heating elements, water jackets, heating pads, heating mats, other heating devices known in the art, or some combination thereof. This may include passive devices (i.e., devices that rely on the ambient environment to manipulate temperature), active devices (i.e., devices that actively add or remove heat from the system to manipulate temperature), or both.

Cooling unit 24 may be thermally coupled to energy storage system (ESS) 20 so that it can manage, control, manipulate and/or otherwise influence the temperature of the ESS. Similar to the heating unit described above, cooling unit 24 may include one or more cooling elements in close proximity with different sections of high-voltage battery pack 40 so that they can lower the temperature of the battery pack during hot environments. Some examples of suitable devices for cooling unit 24 include cooling fans, water jackets, air passages, heat sinks, thermoelectric coolers (e.g., Peltier devices), condensers, other cooling devices known in the art, or some combination thereof. This may include passive devices (i.e., devices that rely on the ambient environment to manipulate temperature), active devices (i.e., devices that actively add or remove heat from the system to manipulate temperature), or both. Although the heating and cooling units are shown here as two separate devices that are outside of and are coupled to ESS 20, it is possible for the heating and/or cooling units to be included within ESS 20, combined with one another, or provided in some other suitable arrangement. According to the exemplary embodiment shown here, heating unit 22 and cooling unit 24 are coupled to control module 26 and receive command signals for conditioning the ESS.

Control module 26 may include any combination of electronic processing devices, memory devices, input/output (I/O) devices, and/or other known components, and may perform various control and/or communication related functions. In an exemplary embodiment, control module 26 is coupled to heating unit 22, cooling unit 24, external data unit 28 and internal data unit 30, and includes an electronic memory device 60 and an electronic processing device 62. Depending on the particular embodiment, control module 26 may be a stand-alone vehicle electronic module (e.g., a vehicle control integrated module (VCIM), a traction power inverter module (TPIM), a battery power inverter module (BPIM), etc.), it may be incorporated or included within another vehicle electronic module (e.g., a power train control module or a hybrid control module), or it may be part of a larger network or system (e.g., a battery management system (BMS), a vehicle energy management system, etc.), to name a few possibilities. Many different types and arrangements of control module 26 may be used with the method described below, as the present method is not limited to any one embodiment.

Memory device 60 may include any type of suitable electronic memory means and can store a variety of data and information. Some non-limiting examples of suitable memory devices include: random access memory (RAM) devices like DRAM, SDRAM, SRAM, etc.; non-volatile and read only memory (ROM) devices like PROM, EPROM, flash, etc.; data storage devices like hard drives, thumb drives, floppy drives, CDROM and DVD drives, optical disk drives, etc. Some non-limiting examples of the types of data and information that may be stored on memory device 60 include: historical data (e.g., driving and parking patterns of the vehicle, weather history for certain areas, data regarding temperatures to which the vehicle has recently or historically been exposed); sensed internal and external data (e.g., those provided by external and internal data units 28, 30); look-up tables and other data structures; algorithms (e.g., the conditioning algorithm described below); vehicle component characteristics and background information (e.g., temperature limits, temperature profiles and operational settings), etc. The conditioning algorithm described below—as well as any combination of information needed to perform such algorithm—may be stored or otherwise maintained in memory device 60.

Processing device 62 may include any type of suitable electronic processor (e.g., a microprocessor, a microcontroller, an application specific integrated circuit (ASIC), etc.) that executes instructions for software, firmware, programs, algorithms, scripts, etc. The exemplary processor 62 is not limited to any one type of component or device, and may include multiple processing devices. Control module 26 may be electronically connected to other vehicle devices and modules via a suitable connection, like a wired or wireless vehicle bus or network, and can interact with them as required. These are, of course, only some of the possible arrangements, functions and capabilities of control module 26, as others are certainly possible.

External data unit 28 may include any combination of hardware and/or software components that are capable of monitoring, sensing, receiving or otherwise obtaining data or information regarding external vehicle conditions. According to one exemplary embodiment, external data unit 28 includes external sensors 70 that sense and report different external vehicle conditions, like the outside air temperature, as well as memory devices, processing devices or other components or devices that may be needed by unit 28. External sensors 70 may include sensors that measure the outside air temperature, humidity and/or precipitation, to cite a few possibilities. As explained below in more detail, external data unit 28 may take one or more measurements of the outside air temperature and provide control module 26 with outside air temperature signals that are representative thereof, so that present method can use such signals when conditioning the high-voltage battery 20.

Internal data unit 30 may include any combination of hardware and/or software components that are capable of monitoring, sensing, receiving or otherwise obtaining data or information regarding internal vehicle conditions. In the exemplary embodiment shown in FIG. 1, internal data unit 30 includes internal sensors 76 that sense and report different internal vehicle conditions, like the temperature of one or more sections of high-voltage battery 20, as well as memory devices, processing devices or other components or devices that may be needed by unit 30. Internal sensors 76 may include sensors that measure the temperature of: one or more sections of high-voltage battery pack 40, another component in energy storage system (ESS) 10, an engine or battery compartment, a drive-train component, or some other component within the vehicle, to cite a few possibilities. It is also possible for internal sensors 76 to measure the voltage, current, state-of-charge (SOC), state-of-health (SOH), or some other parameter of high-voltage battery 20. As explained below in more detail, internal data unit 30 may take one or more measurements of the battery temperature and provide control module 26 with battery temperature signals that are representative thereof, so that present method can use such signals when conditioning the high-voltage battery 20. Any type of sensor that detects conditions within the vehicle may be an internal sensor 76.

In the case where internal sensors 76 monitor battery temperature, the sensors may take readings for one or more individual cells, for a collection or block of cells within battery pack 40 (i.e., a subset of the overall collection of cells), for the entire battery pack, or according to some other method known in the art. Measuring battery conditions for an individual cell (e.g., cell temperature) may be beneficial if, for example, the middle cells experience different temperatures or other battery conditions than the edge or boundary cells of battery pack 40. The same principal of determining battery temperature on a cell-by-cell, collective or other basis also applies to battery voltage, battery current, battery capacitance, or any other battery condition. Battery sensors 76 may employ any type of suitable technique or method for measurement, estimation, evaluation, etc.; this includes both directly and indirectly determining battery conditions. Output from battery sensors 76 may be provided to control module 26 or some other appropriate device via a suitable vehicle communications connection (e.g., a CAN bus, a SPI connection, etc.).

The components of external and/or internal data units 28, 30 may be integrated within or shared by some other vehicle component, device, module, system, etc., they may be stand-alone components (as schematically shown in FIG. 1), or they may be provided according to some other arrangement. To illustrate, one or more of the internal sensors 76 may be the same sensors as used by battery control unit 42, energy storage system (ESS) 20, or some other type of energy management system within the vehicle, as opposed to being dedicated sensors only used by the present method. In such a case, the overall cost of the vehicle can be reduced, as one or more sensors are shared by multiple vehicle systems. Furthermore, external and/or internal data units 28, 30 may employ any suitable technique or method for measuring, estimating, evaluating, filtering, etc.; this includes both directly and indirectly determining external and internal vehicle conditions, respectively. Output from external and/or internal data units 28, 30 may be provided to control module 26 or to some other device in the form of signals via a suitable communications connection (e.g., a CAN bus, a SPI connection, etc.). The method described herein uses vehicle conditions from external and/or internal data units 28, 30 when performing or executing a conditioning algorithm, as will be explained. No particular type of sensor, specific technique for gathering or processing the vehicle conditions, or particular method for providing the vehicle conditions is required for the present method. For instance, it is even possible for the method to receive vehicle conditions like external weather conditions from a weather-related service or website that monitors external conditions and wirelessly communicates those conditions to the vehicle via a communications module 32. Other examples are possible as well.

Communications module 32 may include any combination of hardware and/or software components that enable wireless voice and/or data communication with the vehicle. According to one exemplary embodiment, communications module 32 includes a wireless data unit 80 and a GPS unit 82, and may be bundled or included within a device such as a telematics module. Wireless data unit 80 enables data communication to and from the vehicle and may include a modem (e.g., a modem using EVDO, CDMA, GPRS, or EDGE technologies), a wireless networking component (e.g., one using an IEEE 802.11 protocol, WiMAX, BlueTooth, etc.), or any other device capable of wireless data communication. Depending on the particular embodiment, communications module 22 may communicate over a wireless carrier system (e.g., a cellular network), a wireless network (e.g., a wireless LAN, WAN, etc.), or some other wireless medium. In one example, wireless data unit 80 receives weather forecasts or other weather information from a weather-related service. GPS unit 82, on the other hand, receives signals from a constellation of GPS satellites and uses these signals to determine vehicle position, as is well understood in the art.

Interface 34 may include any combination of hardware and/or software components that enable a vehicle user to exchange information or data with the vehicle. This includes, for example, wired input components like a touch-screen display, a microphone, a keyboard, a pushbutton or other control where user interface 34 receives information from a user, as well as output components like a visual display, an instrument panel, or an audio system where user interface 34 provides information to the user. In some cases, user interface 34 may include components with both input and output capabilities, such as the exemplary visual display 90 shown in FIG. 1. Visual display 90 may include any suitable interface that is located within the vehicle and visually presents information to and/or receives information from a user, and it may be driven by a sequence of navigable menus that enable a user to exchange information with ESS conditioning system 10. Interface 34 may also include an audible interface that audibly presents information to and/or receives information from a user, and it may be part of an on-board automated voice processing system that uses voice-recognition and/or other human-machine interface (HMI) technology. Interface 34 may also include one or more components of a navigation unit 92 that receives information from a user regarding an intended destination or the like. Navigation unit 92 may be a telematics-based unit or a CDROM- or DVD-based unit, to cite a couple of possibilities. Those skilled in the art will appreciate that navigation unit 92 and GPS unit 82 may be combined and do not need to be separately maintained, as shown in the schematic illustration of FIG. 1.

It should be appreciated that the preceding description of ESS conditioning system 10 is only provided for purposes of illustration, and is only done so in a general way. The present method may be used with any number of different systems, including systems that differ from the exemplary ESS conditioning system that is shown in FIG. 1 and described above.

Figure 2:
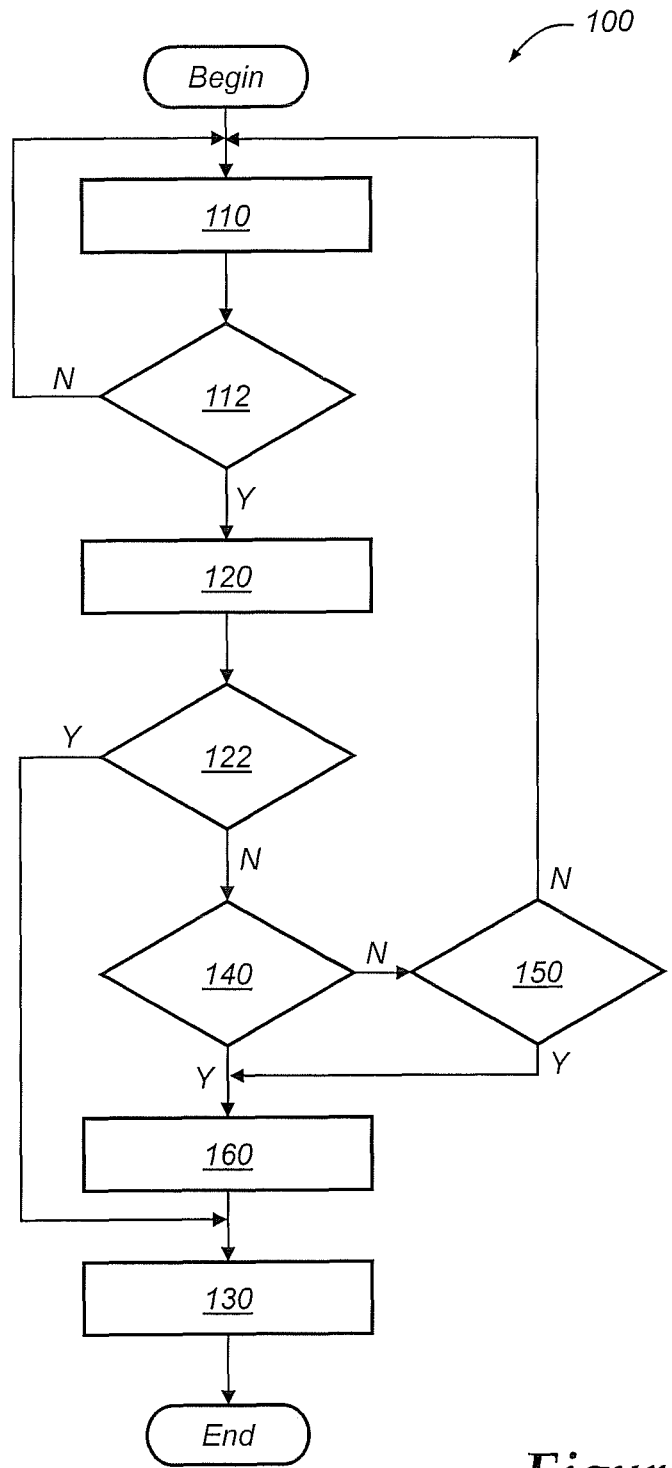
FIG. 2 is a flowchart of an exemplary method that may be used during a drive cycle to condition a vehicle ESS, and may be used with the exemplary system of FIG. 1.
Figure 3:
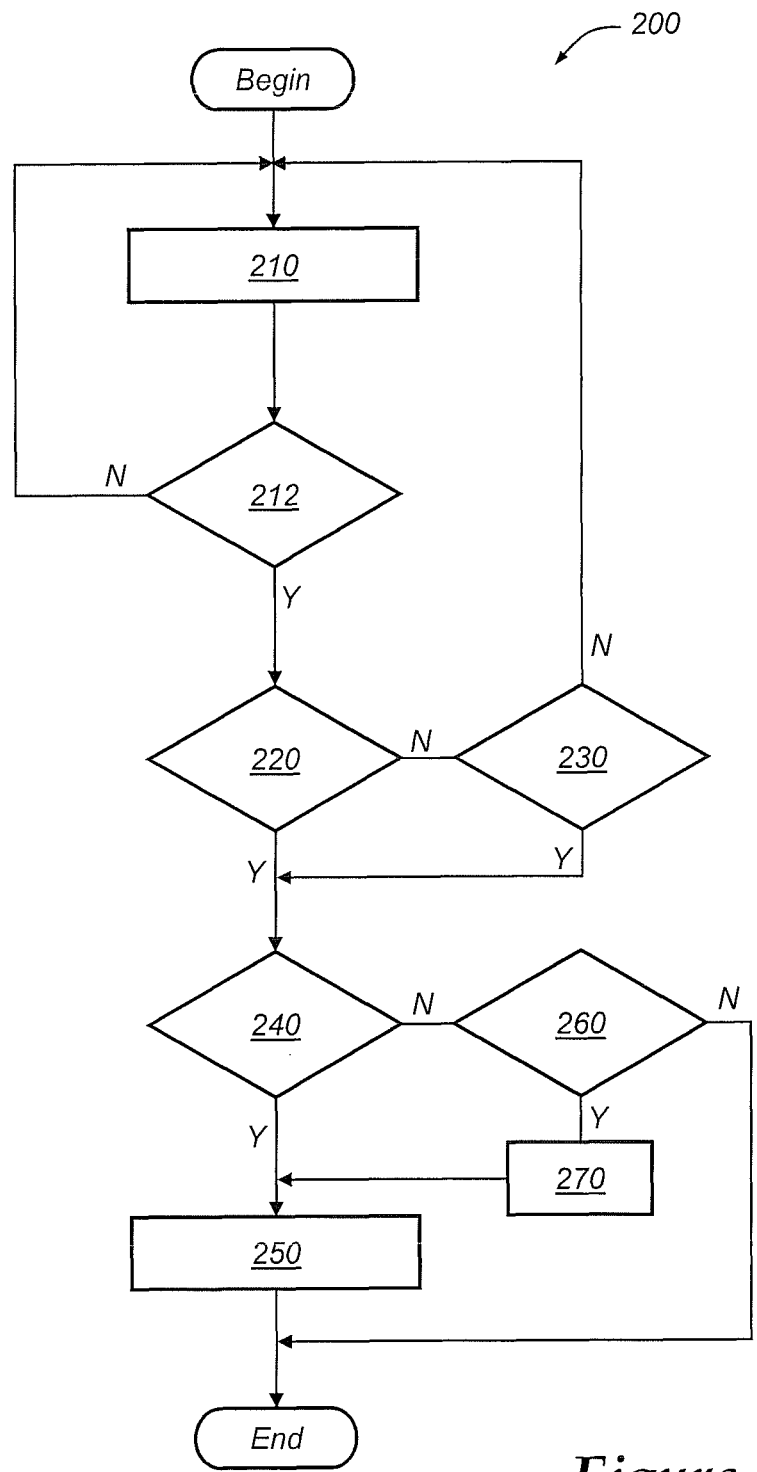
FIG. 3 is a flowchart of an exemplary method that may be used during a park cycle to condition a vehicle ESS, and may be used with the exemplary system of FIG. 1.

Turning now to FIGS. 2 and 3, there are shown exemplary methods 100, 200 for conditioning an energy storage system (ESS) for a vehicle, like a battery used for vehicle propulsion, where the methods seek to avoid or mitigate the effects of prolonged battery exposure to extreme temperatures (e.g., temperatures below about −15° C. or above about 50° C.). Exemplary conditioning methods 100, 200 are designed to address the issue of prolonged exposure to extreme temperatures when the vehicle is parked or is otherwise left unattended. This, in turn, may enhance the performance, duration, lifespan and/or other aspects of the battery. FIG. 2 illustrates an exemplary conditioning method 100, where at least some of the steps are performed while the vehicle is being driven; and FIG. 3 illustrates an exemplary method 200, where at least some of the steps are performed while the vehicle is parked. It is not necessary, however, for the actual exemplary conditioning method to be divided or partitioned in this way, as it is simply presented like this to help illustrate different aspects of the exemplary conditioning method.

Drive Cycle Operation—

With reference to FIG. 2, there is shown an exemplary conditioning method that may at least partially be performed while the vehicle is being driven. Skilled artisans will appreciate that it is not necessary for all of the steps shown in FIG. 2 to be performed or executed while the vehicle is being driven, so long as at least some of the steps are performed during a drive cycle. Generally speaking, method 100 predicts if an energy storage system (ESS) for a vehicle will need conditioning the next time that the vehicle is parked and, if such conditioning is needed, then the method predicts if the ESS has sufficient charge to perform this conditioning. If it appears that there will be sufficient charge, then the method may simply take whatever steps are necessary (e.g., setting a flag) so that the ESS can be properly conditioned the next time that the vehicle is parked. If it appears that there will be insufficient charge, then the method may enable operation of energy generator 18 so that additional charge can be generated and provided to the ESS in anticipation of the needed conditioning. This additional charge may be generated while the vehicle is being driven, and should be sufficient to allow for subsequent conditioning of the ESS the next time that the vehicle is parked. In one example, the conditioning step involves running a fan or some other cooling unit 24 to cool high-voltage battery pack 40.

Beginning with steps 110 and 112, the method determines if energy storage system (ESS) 20 is likely to need conditioning the next time that the vehicle is parked or left unattended. This determination may be performed according to one of a number of different ways. One way is for step 110 to generate a 'heat exposure prediction' that is generally representative of the predicted or estimated amount of heat energy that battery 20 will be exposed to the next time that the vehicle is parked, and for step 112 to compare the heat exposure prediction to some 'heat exposure threshold'. If the heat exposure prediction exceeds the heat exposure threshold, then it is likely that some form of conditioning for battery 20 will be required the next time that the vehicle is parked; if the heat exposure prediction does not exceed the heat exposure threshold, then it is unlikely that the battery will need conditioning when the vehicle is parked next. Of course, there are a variety of different ways for performing these steps and making these predictions. It should be appreciated that the term "parked" includes instances when the vehicle transmission is actually in park or an equivalent state, as well as other instances when the vehicle transmission is not in park but the vehicle is stationary or left unattended for a prolonged period of time.

In one example, step 110 generates the heat exposure prediction by using at least one piece of external data and/or historical data. The term 'external data', as used herein, broadly includes any type of data or information regarding the external environment surrounding the vehicle. According to an exemplary embodiment, step 110 receives and uses at least one piece of external data selected from the group consisting of: an actual outside temperature, a forecasted outside temperature, or a position reading like a latitude/longitude coordinate. For example, step 110 may obtain an actual outside temperature reading from external sensor 70, a forecasted outside temperature from a weather-related service via wireless data unit 80, and/or a position reading in the form of a latitude/longitude coordinate from GPS unit 82. Step 110 may utilize any combination of these or other pieces of data or information to help generate the heat exposure prediction, which is representative of the predicted or estimated amount of heat energy that battery 20 will be exposed to the next time that the vehicle is parked. If, for example, external sensor 70 indicates that the current outside temperature is 30° C. at 7:15 AM, if wireless data unit 80 receives a weather forecast for the surrounding area calling for a daily high of between 38-42° C., and/or if GPS unit 82 determines that the vehicle is currently in an extremely hot location that has an average high for that time of year of about 41° C., then step 110 may use this information to generate a heat exposure prediction that is quite high. Step 110 may also utilize these pieces of external data individually or together, and it may utilize other external data or non-external data, such as temporal data like a time, date, etc. For instance, in the preceding example it may be helpful to know the specific time and date associated with an actual outside temperature reading or forecasted outside temperature when calculating or otherwise determining the heat exposure prediction.

The preceding examples of external data can help step 110 more accurately predict or estimate the likely temperature of the surrounding area of the vehicle, but they do not necessarily provide information regarding the amount of time that the vehicle will likely be parked. The heat exposure prediction may take into account both the temperature and the duration of exposure, as both factors can impact the overall amount of heat energy to which the battery will be exposed. Historical data, which is discussed next, may be used to generate a more accurate prediction of the amount of time or duration of exposure. In an exemplary embodiment, step 110 uses at least one piece of external data and at least one piece of historical data to generate the heat exposure prediction; that is, the step uses both external and historical data to make this prediction.

The term 'historical data', as used herein, broadly includes any type of data or information regarding the past history or behavior of the vehicle or the driver. According to an exemplary embodiment, step 110 receives and uses at least one piece of historical data selected from the group consisting of: past parking behavior, past driving behavior, or a prediction error value. The past parking behavior and/or the past driving behavior may be based on previous parking and/or driving patterns, and may pertain to isolated events (e.g., the amount of time that the vehicle was last parked) or to averaged events (e.g., the average duration over the previous five times that the vehicle was parked), to cite a few possibilities. Step 110 may utilize pieces of historical data individually or together, and it may utilize this information with other historical data or non-historical data, such as temporal data. To illustrate, consider the example where a driver is driving to work at 7:15 AM on a Tuesday. Step 110 may use this information to determine that, according to past historical data, when the vehicle is being driven between 7:00 and 7:30 AM on a Tuesday morning, the vehicle is likely to be parked for an average of 7.2 hours once it reaches its destination. This information could be used in combination with the external data above, which suggests that it is likely to reach 41° C. that day, in order to arrive at a heat exposure prediction. Other forms of historical data may be used as well. For instance, step 110 may use past driving behavior to recognize that the vehicle is currently being driven on a certain route that usually results in the vehicle being parked for 7.2 hours once it reaches its destination. Route matching and the like is an example of past driving behavior and is a type of historical data. It should be appreciated that any form of historical data regarding the vehicle or the driver, including parking behavior and driving behavior, may be employed by step 110 to help estimate or otherwise generate a heat exposure prediction.

Step 110 may also use a prediction error value when determining the heat exposure prediction. A 'prediction error value' generally refers to the error or delta between previous heat exposure predictions and actual heat exposure values. Those skilled in the art will appreciate that the prediction error value may be used in a closed-loop feedback system according to any number of different schemes or techniques that seek to minimize or shrink the size of the error. Some non-limiting examples of closed-loop feedback techniques that may be employed include those that use proportional, integral, derivative, proportional-integral-derivative (PID) control, etc.; although others could be used instead. It is also possible for step 110 to use driver input when generating the heat exposure prediction. A driver could inform ESS conditioning system 10 of any upcoming events that could result in prolonged exposure to extreme temperatures. For instance, if a driver knew that they were parking their vehicle in an uncovered parking lot at the Pheonix airport for a week in the summer time, then this information could be inputted into system 10 via interface 34 and taken into account by step 110.

Once a heat exposure prediction is determined, step 112 may compare this prediction or estimate to a heat exposure threshold. The heat exposure prediction and threshold may be expressed in a variety of different forms or units. In one example, the heat exposure prediction and/or threshold are expressed in quantitative terms, such as in energy units like Joules (J)) or British Thermal Units (BTUs). In another example, the heat exposure prediction and/or threshold are expressed in qualitative terms, like "low heat exposure," "medium heat exposure" and "high heat exposure." Other forms or units for the heat prediction and/or threshold are also possible. If the heat exposure prediction exceeds the heat exposure threshold, then it is likely that some form of conditioning for battery 20 will be required the next time that the vehicle is parked, and the method advances to step 120; if the heat exposure prediction does not exceed the heat exposure threshold, then it is unlikely that the battery will need conditioning when the vehicle is parked next, and the method returns to step 110 for continued monitoring. The heat exposure threshold may be based on the particular battery being used, as different battery types and chemistries may have different thermal limitations. It should be appreciated that the term "exceed," as used herein, means to go beyond or outside of and can include being greater than or less than. In step 112, for example, a really high heat exposure prediction can "exceed" a heat exposure threshold by being greater than the threshold, and a really low heat exposure prediction can "exceed" a heat exposure threshold by being less than the threshold.

Next, steps 120 and 122 determine if the energy storage system (ESS) 20 is likely to have enough charge to perform the needed conditioning the next time that the vehicle is parked. In an exemplary embodiment, step 120 predicts how much excess charge or charge capacity there will be on battery 20 once the vehicle reaches its destination (an estimate referred to here as the "charge capacity prediction"), and step 122 compares the charge capacity prediction to the previously determined heat exposure prediction to see if battery 20 will likely have enough charge to run heating unit 22 and/or cooling unit 24 when the vehicle is parked next. The charge capacity prediction is generally representative of the predicted or estimated amount of charge that the battery will have the next time that the vehicle is parked. Consider the example where steps 110 and 112 previously determined that it is likely to be very hot that day and, based on past experience, battery 20 is likely to be exposed to a significant amount of heat for a prolonged period of time. If the charge on battery 20 is already low during the drive cycle, then there may not be enough charge to operate cooling unit 24 once the vehicle reaches its destination and is parked; this could be exacerbated if there is no power outlet or other means at the destination for recharging the vehicle. Thus, the method attempts to predict or anticipate such a situation before it arises and to take remedial measures accordingly, as will be explained.

Step 120 may use a variety of different methods to determine the charge capacity prediction, including the use of external data and/or historical data, as described above. For example, step 120 may use position readings from GPS unit 82 and past driving behavior stored in memory device 60 to compare the current route of the vehicle with previous routes. If the routes match up, then step 120 could establish the charge capacity prediction as the amount of charge that is typically left over when the vehicle finishes the current route that it is on. In another example, step 120 performs a similar route matching procedure. However, if the vehicle's current route is matched up with a stored route, step 120 uses the stored route to estimate the amount of charge that it will likely take to reach the predicted destination, and then subtracts this from the current amount of charge on battery 20. This too will provide the method with a charge capacity prediction. Of course, if the driver has actually provided a route or destination to navigation unit 92, then this information may be used to estimate the amount of charge that is likely to be left over when the vehicle reaches its destination. Driver use of navigation unit 92 may act as an override and take precedent over alternative methods for determining a charge capacity prediction. In yet another example, step 120 may simply establish the charge capacity prediction as the average amount of charge that is usually available or left over when the vehicle is put in park or at some other time (e.g., what is the average amount of charge left on the battery on Tuesdays). These and other techniques may be used by step 120 to determine the charge capacity prediction, as the step is not limited to any particular one.

Step 122 may now compare the charge capacity prediction to the heat exposure prediction from step 110, in order to determine if battery 20 will have enough charge on it when the vehicle reaches its destination to perform the needed conditioning. These two predictions may need to be converted first into some type of common units in order to perform a proper quantitative comparison, for example in kilowatt·hours (Kw·H). As explained above in conjunction with step 112, it is possible for step 122 to perform a quantitative comparison or a qualitative comparison. If the charge capacity prediction exceeds the heat exposure prediction, then it is likely that battery 20 will have enough charge to perform whatever conditioning is needed, and the method advances to step 130 where an internal flag is set to allow such conditioning the next time that the vehicle is parked. If the charge capacity prediction does not exceed the heat exposure prediction, then it is unlikely that battery 20 will have enough charge to perform the expected conditioning. At this point, method 100 has determined that some type of battery conditioning will probably be needed the next time that the vehicle is parked, and that the battery will probably not have enough charge to perform this conditioning. It is possible for the method to simply proceed to step 160, which instructs energy generator 18 to start producing more charge, or the method can proceed to optional step 140. It may not be desirable to run high-voltage battery 40 down to really low charge levels, thus, step 122 may provide for some type of calibration to provide for a certain residual charge.

The delta or difference between the charge capacity prediction and the heat exposure prediction is referred to as the 'predicted difference' and is generally representative of the difference between the predicted amount of charge that will be on the battery and the predicted amount of charge that will be needed to condition the battery the next time that the vehicle is parked. The predicted difference may be used later on in method 100, as subsequently explained.

Optional step 140 checks to see if there are any other events scheduled that would turn on energy generator 18 before actually operating that device. To understand the reasoning behind step 140, it should be pointed out that some owners of hybrid electric vehicles (HEVs), plug-in hybrid electric vehicles (PHEVs), extended-range electric vehicles (EREVs), battery electrical vehicles (BEVs), and other vehicles having an energy storage system (ESS) only wish to run an energy generator (e.g., one driven by an internal combustion engine) when absolutely necessary, as it may lower the overall fuel economy of the vehicle. Thus, step 140 determines if there are any other scheduled events that would already result in energy generator 18 being operated. Examples of such scheduled events may include a periodic fuel freshness cycle, as disclosed in U.S. Patent Application Publication No. 2010/0256931 which is assigned to the present assignee and is incorporated herein by reference, or an engine maintenance cycle where the engine is periodically run in order to keep the seals lubricated, etc. In both of these examples, the vehicle is already planning to turn on the internal combustion engine that drives energy generator 18 in the near future (e.g., within a matter of hours, days, weeks, etc.), so step 140 simply pulls ahead that schedule and runs the energy generator now, step 160. This combines the tasks of providing additional charge to battery 20 for future conditioning, as well as performing the scheduled event that was going to take place anyways. If step 140 determines that no such scheduled events exist, then the method may proceed to optional step 150 which evaluates the threat level reflected in the heat exposure prediction.

Like the previous step, step 150 is optional and provides the method with another opportunity to charge battery 20 so that it can power the needed conditioning the next time that the vehicle is parked. In an exemplary embodiment, step 150 evaluates a threat level to the battery and if the threat level exceeds a threat threshold, then the method proceeds to step 160 so that energy generator 18 operates and charges the battery. The threat level may be derived from the heat exposure prediction determined in step 110, and can be quantitative or qualitative in nature. For example, if step 110 predicts that the battery will be subject to extreme temperatures for a prolonged period of time (i.e., an extended soak), then step 150 may determine that the threat level is quite high. Step 150 serves to protect battery 20 in cases of an elevated threat to heat exposure, even though no other energy generator turn-on events are scheduled to occur.

Step 160 runs or operates energy generator 18 so that additional charge, which will be used to power a future conditioning event, may be provided to and stored on battery 20. The parameters for operating energy generator 18 may vary on the circumstances and, in one embodiment, are influenced by the predicted difference determined back in step 122. As previously explained, the predicted difference generally represents the difference between the predicted amount of charge that will be on the battery and the predicted amount of charge that will be needed to condition the battery the next time that the vehicle is parked. Thus, step 160 may use the predicted difference to run energy generator 18 such that enough charge is generated to make up for a predicted difference shortfall; if the predicted difference ended up as an excess, instead of a shortfall, then it generally would not be necessary to operate energy generator 18.

Optionally, step 160 could query the driver before turning on and operating energy generator 18. Some drivers may want to control when energy generator 18 is turned on and operated, especially if the generator is driven by an internal combustion engine. This query could be presented to the driver via interface 34 or some other suitable device. Following step 160, the method proceeds to step 130, where an internal flag or other marker can be set that enables or allows subsequent conditioning of battery 20 when the vehicle is left unattended or is parked.

Park Cycle Operation—

Turning now to FIG. 3, there are shown a number of steps of an exemplary method 200 which may be used to condition an energy storage system (ESS) like battery 20. Skilled artisans will appreciate that it is not necessary for all of the steps shown in FIG. 3 to be performed or executed when the vehicle is in park, so long as at least some of the steps are performed during a park cycle. Beginning with step 210, the method measures, gathers or otherwise receives a reading for an energy storage system (ESS) temperature. In one embodiment, this measurement is provided by internal sensors 76, which are coupled to high voltage battery pack 40, and is representative of some type of battery temperature. For instance, the battery temperature could be a single temperature reading (e.g., a single cell temperature, a collective or averaged temperature, an overall battery pack temperature, etc), it could be a collection of temperature readings (e.g., a number of individual cells or a block of cells within battery pack 40), or it could be some other battery temperature. It is even possible for step 210 to acquire the battery temperature from a component, device, module, etc. other than internal data unit 30. Next, step 212 compares the battery temperature to some temperature threshold (e.g., 50° C.). If the battery temperature does not exceed the temperature threshold, then the method returns to step 210 for additional monitoring, as there is currently little danger due to excessive thermal input. If, however, the battery temperature exceeds the temperature threshold, then the method proceeds to step 220.

In step 220, the method determines if the energy storage system (ESS) is likely to need conditioning now that the vehicle is parked. This determination may be made in a number of different ways, one of which is to simply recall back to steps 110 and 112 to see if the heat exposure prediction exceeds the heat exposure threshold. It should be appreciated that the heat exposure prediction and/or threshold may be updated since the time that they were originally generated in steps 110 and 112, which was when the vehicle was being driven. One way for updating this information is by using the current battery temperature just taken in step 210; this may ease the challenge of trying to guess what the temperature of the battery will be, as there is now an actual temperature reading while the vehicle is parked. If step 220 concludes that it is unlikely that the battery will be subject to extreme temperatures for an extended period of time and thus does not need to be conditioned, the method advances to optional step 230 where one last check is performed before sending control of the method back to step 210 for additional monitoring.

Step 230 compares the recent battery temperature to a critical temperature threshold in order to determine if the battery temperature currently poses a problem or threat to battery 20. If the battery temperature does not exceed some critical temperature threshold (e.g., if it is less than 70° C.), then the method loops back to step 210 for additional monitoring; if the battery temperature exceeds the critical temperature threshold, then the method continues to step 240. As mentioned previously, "exceeding" can include being greater than or less than, depending on the circumstances.

Step 240 is optional and checks to see if a flag or other indicator was previously set to enable or allow conditioning of the battery when the vehicle is parked. The previous description of an exemplary drive cycle provides examples of when such a flag could be set. If an enable flag is set, then step 250 conditions battery 20 with cooling unit 24 or heating unit 22 so that the battery temperature is influenced in some way; this may include, for example, lowering the battery temperature, raising the battery temperature, or maintaining the battery temperature. As stated above, step 240 is optional. Thus, it is possible for method 200 to proceed directly from steps 220 or 230 to step 250, without inquiring as to the status of a flag. If step 240 determines that an enable flag has not been set, the step 240 may send control of the method to step 260.

In step 260, the method determines if there is enough fuel to start and operate the energy generator. For instance, in the case of energy generator 18 which is driven by an internal combustion engine, step 260 may query one or more fuel level sensors or modules to determine the current fuel level. If there is insufficient fuel for operating energy generator 18, then the method simply ends without conditioning the battery. If there is a sufficient amount of fuel, then step 270 turns on energy generator 18 and provides battery 20 with enough charge for the desired conditioning event to take place. The operational parameters used to run energy generator 18, including how long the generator is run, how much charge is produced, etc., may be dictated by a number of factors, including the predicted difference from step 122 which, in this case, may relate to the amount of charge deficiency in battery 20. It is possible for users to turn off this feature and thus prevent any engine turn-on events when the vehicle is parked and unattended. A setting or the like may be used to represent the user's choice in the matter, and may be consulted by step 270 before actually turning energy generator 18 on. Other techniques for initiating or controlling the energy generator may be used as well.

Once a sufficient amount of charge is generated and provided to battery 20, step 250 may condition battery 20 with cooling unit 24 or heating unit 22 so that the battery temperature is influenced in some way. It should be appreciated that all of the thresholds and other values mentioned above may be static or dynamic, calibratable or non-calibratable, and may be based on battery life and/or other criteria. Although the preceding examples have all been in the context of an extremely hot environment where a cooling unit would be needed to cool down the battery, it is also possible for the present method to be used in an extremely cold environment where a heating unit would be needed instead.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of conditioning an energy storage system (ESS) for a vehicle, the method comprises the steps of:
   (a) predicting with a control module if the energy storage system (ESS) is likely to need future conditioning the next time that the vehicle is parked;
   (b) predicting with a control module if the energy storage system (ESS) is likely to have enough charge to perform the future conditioning the next time that the vehicle is parked, wherein at least one of steps (a) or (b) is performed while the vehicle is being driven so that future conditioning needs can be anticipated before the vehicle is parked;
   (c) if step (b) predicts that the energy storage system (ESS) is likely to have enough charge to perform the future conditioning, then enabling the future conditioning for the next time that the vehicle is parked; and
   (d) if step (b) predicts that the energy storage system (ESS) is not likely to have enough charge to perform the future conditioning, then operating an energy generator that provides the energy storage system (ESS) with additional charge in preparation for the future conditioning.

2. The method of claim 1, wherein step (a) further comprises predicting if the energy storage system (ESS) is likely to need future conditioning by generating a heat exposure prediction that is representative of the predicted or estimated amount of heat energy that the ESS will be exposed to the next time that the vehicle is parked.

3. The method of claim 2, wherein step (a) further comprises generating the heat exposure prediction by receiving and using at least one piece of external data selected from the group consisting of: an actual outside temperature, a forecasted outside temperature, or a position reading.

4. The method of claim 2, wherein step (a) further comprises generating the heat exposure prediction by receiving and using at least one piece of historical data selected from the group consisting of: past parking behavior, past driving behavior, or a prediction error value.

5. The method of claim 4, wherein step (a) further comprises generating the heat exposure prediction by using a prediction error value in a closed-loop feedback system.

6. The method of claim 2, wherein step (a) further comprises comparing the heat exposure prediction to a heat exposure threshold, and if the heat exposure prediction exceeds the heat exposure threshold then predicting that the energy storage system (ESS) is likely to need future conditioning the next time that the vehicle is parked.

7. The method of claim 1, wherein step (b) further comprises predicting if the energy storage system (ESS) is likely to have enough charge by generating a charge capacity prediction that is generally representative of the predicted or estimated amount of charge that the ESS will have in the future the next time that the vehicle is parked.

8. The method of claim 7, wherein step (b) further comprises generating the charge capacity prediction by using a route matching technique to match a current route of the vehicle with one or more stored routes that are part of a past driving behavior.

9. The method of claim 7, wherein step (b) further comprises generating the charge capacity prediction by using a route that is provided by a navigation unit within the vehicle.

10. The method of claim 7, wherein step (b) further comprises generating the charge capacity prediction by using a prediction error value in a closed-loop feedback system.

11. The method of claim 1, wherein step (d) further comprises checking if there are other scheduled events that turn on the energy generator before operating the energy generator.

12. The method of claim 11, wherein if there are other scheduled events then operating the energy generator during the other scheduled events, and if there are not other scheduled events then evaluating a threat level to the energy storage system (ESS) and only operating the energy generator if the threat level is above a threat threshold.

13. A method of conditioning an energy storage system (ESS) for a vehicle, the method comprises the steps of:
  (a) determining with a control module if the energy storage system (ESS) is likely to need conditioning the next time that the vehicle is parked;
  (b) determining with a control module if the energy storage system (ESS) is likely to have enough charge to perform the conditioning the next time that the vehicle is parked;
  (c) if step (b) determines that the energy storage system (ESS) is likely to have enough charge to perform the conditioning, then enabling the conditioning for the next time that the vehicle is parked; and
  (d) if step (b) determines that the energy storage system (ESS) is not likely to have enough charge to perform the conditioning then checking if there are other scheduled events in the future that turn on an energy generator, if there are other scheduled events in the future then operating the energy generator during the other scheduled events, and if there are no other scheduled events in the future then operating the energy generator while the vehicle is being driven to provide the energy storage system (ESS) with additional charge, wherein at least one scheduled event that turns on the energy generator is selected from the group consisting of: a fuel freshness cycle or an engine maintenance cycle.

14. The method of claim 1, further comprising the step of: conditioning the energy storage system (ESS) with a cooling unit or a heating unit so that an energy storage system (ESS) temperature is influenced.

15. The method of claim 1, further comprising the steps of:
  (e) receiving an energy storage system (ESS) temperature while the vehicle is parked;
  (f) predicting if the energy storage system (ESS) is likely to be exposed to extreme temperatures for an extended period of time while the vehicle is parked; and
  (g) if the energy storage system (ESS) temperature exceeds a temperature threshold and step (f) predicts that the energy storage system (ESS) will likely be exposed to extreme temperatures for an extended period of time while the vehicle is parked, then operating a cooling unit or a heating unit that influences the energy storage system (ESS) temperature.

16. The method of claim 15, wherein step (f) further comprises predicting if the energy storage system (ESS) is likely to be exposed to extreme temperatures for an extended period of time while the vehicle is parked by using at least one piece of external data selected from the group consisting of: an actual outside temperature, a forecasted outside temperature, or a position reading.

17. The method of claim 15, wherein step (f) further comprises predicting if the energy storage system (ESS) is likely to be exposed to extreme temperatures for an extended period of time while the vehicle is parked by using at least one piece of historical data selected from the group consisting of: past parking behavior, past driving behavior, or a prediction error value.

18. The method of claim 15, further comprising the step of: determining if there is enough fuel to start an energy generator, and if there is enough fuel then starting the energy generator and providing charge to the energy storage system (ESS) before operating the cooling unit or the heating unit.

* * * * *